(12) United States Patent
Kawai

(10) Patent No.: US 6,185,869 B1
(45) Date of Patent: *Feb. 13, 2001

(54) DOOR GLASS RUN FOR A MOTOR VEHICLE

(76) Inventor: Katsunori Kawai, 130, Shinmon, Abara, Shinkawa-cho, Nishikasugai-gun Aichi-ken, 452-0901 (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/322,032

(22) Filed: May 28, 1999

(30) Foreign Application Priority Data

May 28, 1998 (JP) .................................. 10-164321
Jul. 1, 1998 (JP) .................................. 10-202784

(51) Int. Cl.[7] .................................................. E05D 15/16
(52) U.S. Cl. ............................................ 49/441; 49/489.1
(58) Field of Search ........................ 49/440, 441, 475.1, 49/489.1, 490.1, 495.1

(56) References Cited

U.S. PATENT DOCUMENTS

| 4,897,298 | * | 1/1990 | Otawa et al. ................. 49/441 X |
| 5,007,202 | * | 4/1991 | Guillon ........................... 49/441 |

FOREIGN PATENT DOCUMENTS

| 403854 | * | 12/1990 | (EP) ................................. 49/441 |
| 222921 | * | 9/1988 | (JP) ................................. 49/441 |

* cited by examiner

Primary Examiner—Jerry Redman

(57) ABSTRACT

A door glass run for attachment to a channel having a generally U-shaped cross-section, which is provided along an inner periphery of a door frame of a motor vehicle, for effecting a seal between the door frame and a periphery of the door glass elevated to its fully closed position. The glass run has a main body including a bottom wall and side walls extending from widthwise ends of the bottom wall so as to face each other, and seal lips which extend from ends of the side walls of the main body in facing directions for holding the periphery of the door glass. The bottom wall is formed to have a gable roof cross-section such that a widthwise center thereof bends and rises outwardly.

9 Claims, 5 Drawing Sheets

DOOR GLASS RUN FOR A MOTOR VEHICLE

BACKGROUND OF THE INVENTION

1. Field of the Invention

The present invention relates to a door glass run for attachment along an inner periphery of a motor vehicle door frame.

2. Description of Related Art

As shown in FIG. 1, in a motor vehicle door 1, a door glass run (hereinafter referred to as "glass run") 3 is continuously attached along an inner periphery of a door frame 2 to guide a door glass 6 to its closed and open positions. When the door glass 6 is elevated to its fully closed position, the glass run 3 effects a seal between the door glass 6 and door frame 2.

The glass run 3 is generally composed of rubber, elastomer or synthetic resin, and is formed by continuously connecting extruded glass runs 3A, 3B and 3C via molded corner parts 3D and 3E. The glass run 3 has an approximately identical cross-section over the entire length thereof, and as shown in FIG. 2, includes a main body 30 having a generally U-shaped cross-section. The main body 30 includes a bottom wall 31 and side walls 32a and 32b which face each other. Seal lips 33a and 33b extend inwardly from ends of the side walls 32a and 32b, and molding lips 34a and 34b extend outwardly from the ends of the side walls 32a and 32b and turn upwardly.

To attach the thus arranged glass run 3 to the door frame 2, the main body 30 is mounted into a channel 20 having a U-shaped cross-section, which is formed along the inner periphery of the door frame 2, so as to hold walls of the channel 20 with molding lips 34a and 34b and side walls 32a and 32b of the main body 30. Seal lips 33a and 33b seal the periphery of the door glass 6 from both sides thereof.

There is another type of glass run, which has no molding lips, but instead, has projections at ends of the side walls of a main body thereof for covering the ends of the side walls of the channel 20 to be fitted thereon.

It is difficult to form the glass runs 3A, 3B and 3C into a configuration having the ends of the seal lips 33a and 33b coming close into contact with each other. Accordingly, as shown in FIG. 3, the glass runs 3A, 3B and 3C have been formed into a configuration having the side walls 32a and 32b increasingly spread apart from each other in the direction of an opening 35 of the glass run 3 so as to separate the ends of the seal lips 33b and 33a from each other. The molded corner parts 3E and 3D for connecting the extruded glass runs 3A, 3B and 3C are also formed into a configuration wherein the side walls increasingly spread apart in the direction of their openings, which is substantially identical to that of the extruded glass runs 3A, 3B and 3C (FIG. 3).

The glass run 3 thus formed has been mounted to the channel 20 by pinching the side walls 32a and 32b with fingers or the like and pressing them in the directions of the white arrows in FIG. 3 such that the side walls 32a and 32b turn about angular portions 31a and 31b into approximately parallel relation to each other.

However, when the glass run 3 is mounted to the channel 20, widthwise ends of the bottom wall 31 interfere with opening ends 21 of the channel 20. To overcome this problem, the glass run 3 has been tilted with respect to the channel 20 into a readily insertable posture upon inserting it into the channel 20. With this method as shown in FIG. 4, the molding lip 34a or the above-described projection may enter channel 20 causing a problem. In particular, as shown, where the side walls 32a and 32b have different heights, the above-described problem may frequently occur. Consequently, the work efficiency in attaching the glass run 3 is low.

When the corner part 3D, which curves at an approximate right angle, is mounted to the channel 20 by pressing the side walls 32a and 32b into a generally parallel relation, end portions of the side walls 32a and 32b, which are on the radial inside thereof, are compressed in the curving direction thereof. Consequently, as shown in FIG. 5, the side walls 32a and 32b, molding lips 34a and 34b, and seal lips 33a and 33b respectively, generate a surplus 7 which protrudes outwardly from the center of the corner part 3D.

Thus, to fit the molded corner part 3D to the channel 20, a large pressing force is needed. Consequently, the work efficiency in attaching the glass run is low. The resultant protrusions in the seal lips 33a and 33b decrease the effectiveness of the seal provided against the door glass 6. Also, the resultant protrusions in the side walls 32a and 32b, and molding lips 34a and 34b impair the close fit against the side walls of the channel 20, and cause the generation of gaps between ends of the molding lips 34a and 34b and the side walls of the channel 20, degrading the external appearance around the door frame 2.

SUMMARY OF THE INVENITON

It is an object of the present invention to provide a glass run having a bottom wall which does not interfere with opening ends of a channel formed in a door frame upon attaching of the glass run thereto, and having molding lips or projections provided at ends of side walls which do not get into the channel, and which can be easily attached.

It is another object of the present invention to provide a glass run having a molded corner part which can also be easily attached and with an improved external appearance, without generating any surplus or protrusion in the molded part.

The glass run of the present invention is mounted to a channel having a generally U-shaped cross-section, which is formed along an inner periphery of a motor vehicle door frame . The glass run of the present invention has a main body including a bottom wall and side walls extending from widthwise ends of the bottom wall in a generally parallel relationship to each other, and seal lips extending inwardly from ends of the side walls for holding the periphery of the door glass. The bottom wall is formed to have a gable roof-like cross-section such that a peak portion thereof bends and rises outwardly to define a bending part.

When the side walls of the main body are pressed inwardly for fitting the glass run to the channel of the door frame, a compression force is applied to the bottom wall in the width direction thereof, further bending the bottom wall along a bending part to reduce the width. With this arrangement, the glass run can be readily fitted to the channel without having to tilt the glass run with respect to the channel, and molding lips or projections extending from the ends of the side walls are prevented from getting into the channel.

In a preferred embodiment of the present invention, the thickness of the bending part provided in the bottom wall is less than those of angular parts which connect the widthwise ends of the bottom wall to the side walls.

With this arrangement, upon receiving the compression force, the bending part bends before the angular parts, thereby ensuring the decrease in the width of the bottom wall.

The present invention can be applied to a glass run having a plurality of extruded glass runs and a plurality of molded glass runs, each of the plurality of molded glass runs having a corner-like configuration and connecting the plurality of extruded glass runs to each other. In this case, the bottom wall of at least the molded glass run which curves at approximately a right angle is formed to have the above-described gable roof-like cross section.

The present invention is particularly effective when applied to a glass run provided with molding lips, each extending from an end of each side wall of the glass run outwardly, and further extending along each side wall of the glass run to hold each side wall of the channel with the facing side wall.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 1:
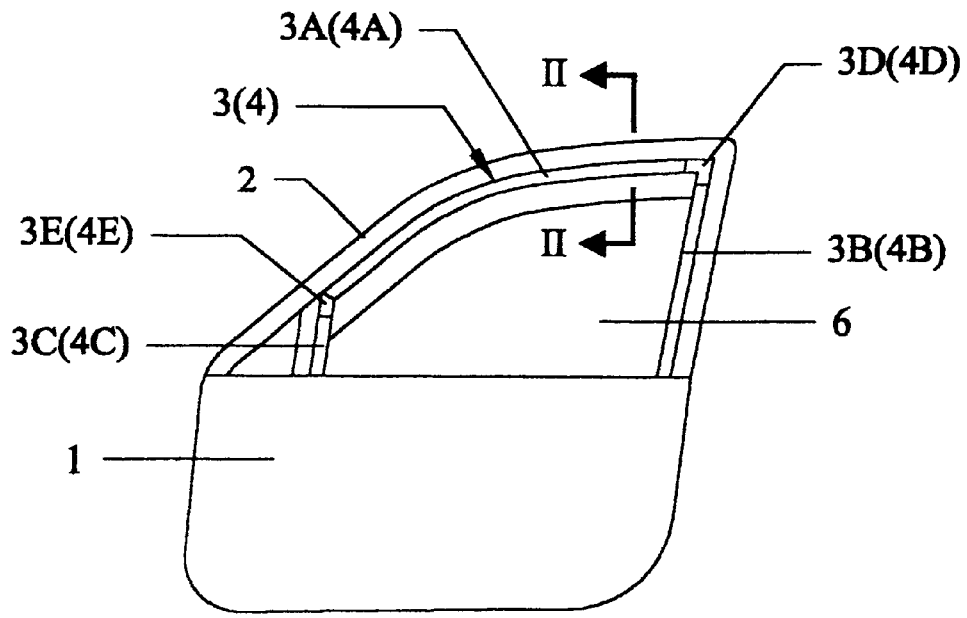
FIG. 1 is a front view of a motor vehicle door to which a glass run is attached.
Figure 2:
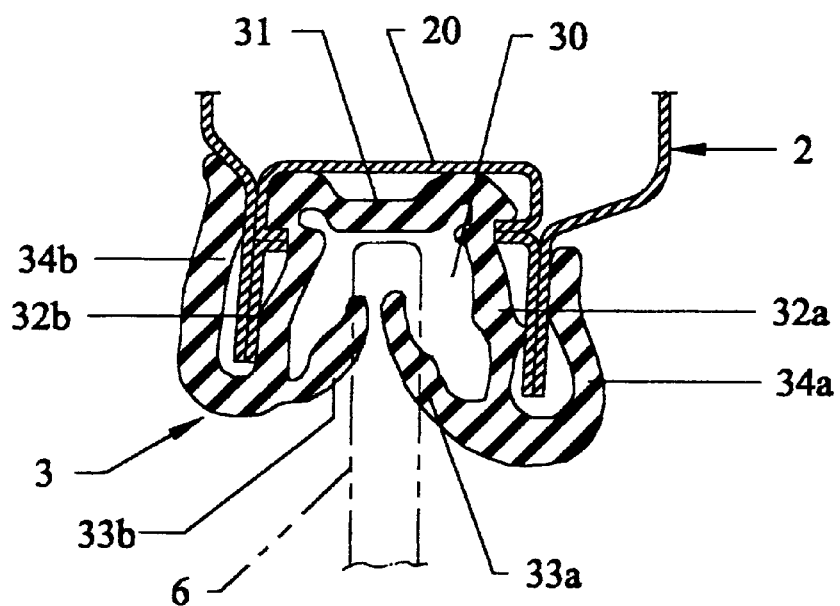
FIG. 2 is a cross-sectional view of a conventional glass run attached to the motor vehicle, which is taken along the line II—II of FIG. 1.
Figure 3:
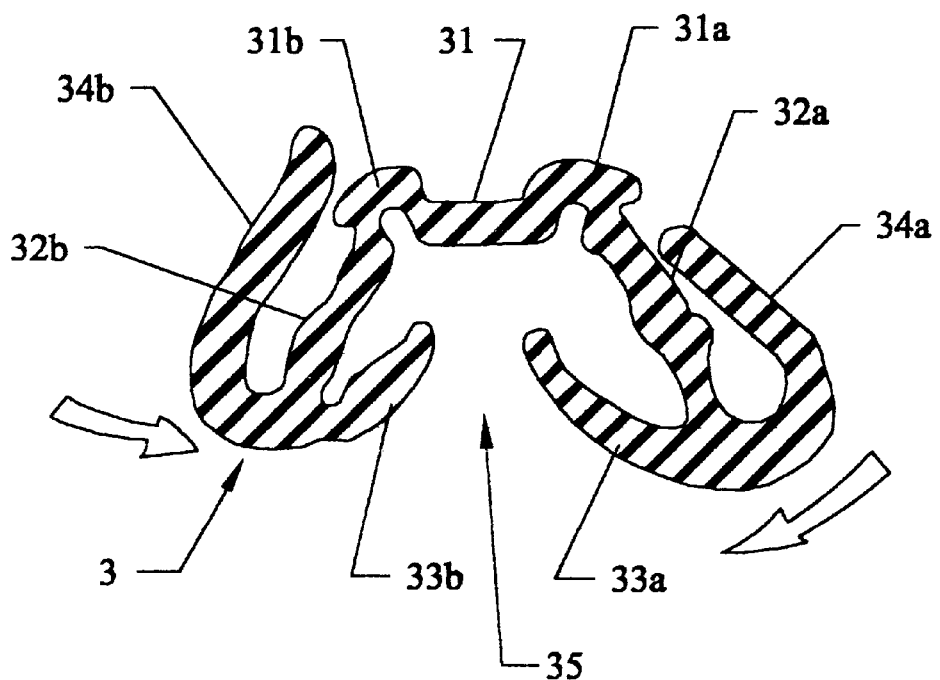
FIG. 3 is a cross-sectional view of the conventional glass run which is prior to attachment to the motor vehicle.
Figure 4:
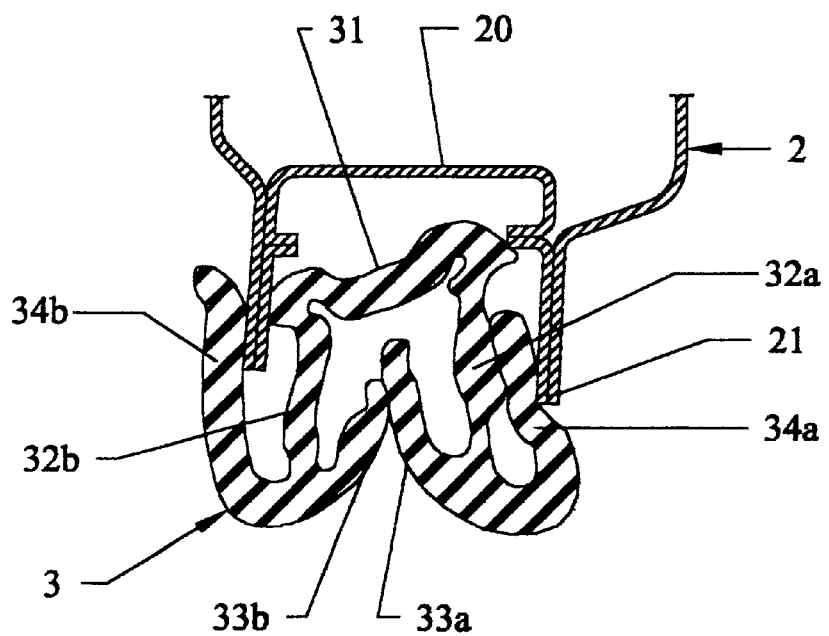
FIG. 4 is a cross-sectional view illustrating the disadvantages occurring upon attaching the conventional glass run to a door frame.
Figure 5:
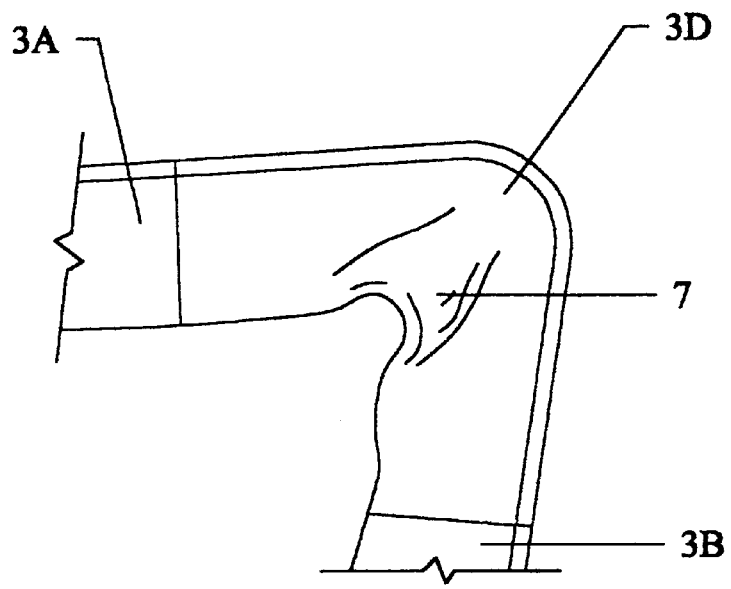
FIG. 5 is a view illustrating the deformation of a corner part of the conventional glass run, which occurs upon attaching the same to the door frame.

As shown in FIG. 1, a glass run 4 includes glass runs 4A, 4B and 4C which are respectively formed by extrusion into a straight configuration, and corner parts 4D and 4E which are respectively formed by molding into a corner-like configuration. The extruded glass runs 4A, 4B and 4C are continuously connected to each other via the corner parts 4D and 4E. The glass run 4, thus arranged, is attached along an inner periphery of a door frame 2. The molded corner part 4D is formed by placing ends of the extruded glass runs 4A and 4B in a mold so as to face each other, and injecting a rubber material identical to that of the extruded glass runs 4A and 4B into the mold. The molded corner part 4E is also formed between the extruded glass runs 4A and 4C, similarly to the molded corner part 4D.

Figure 6:
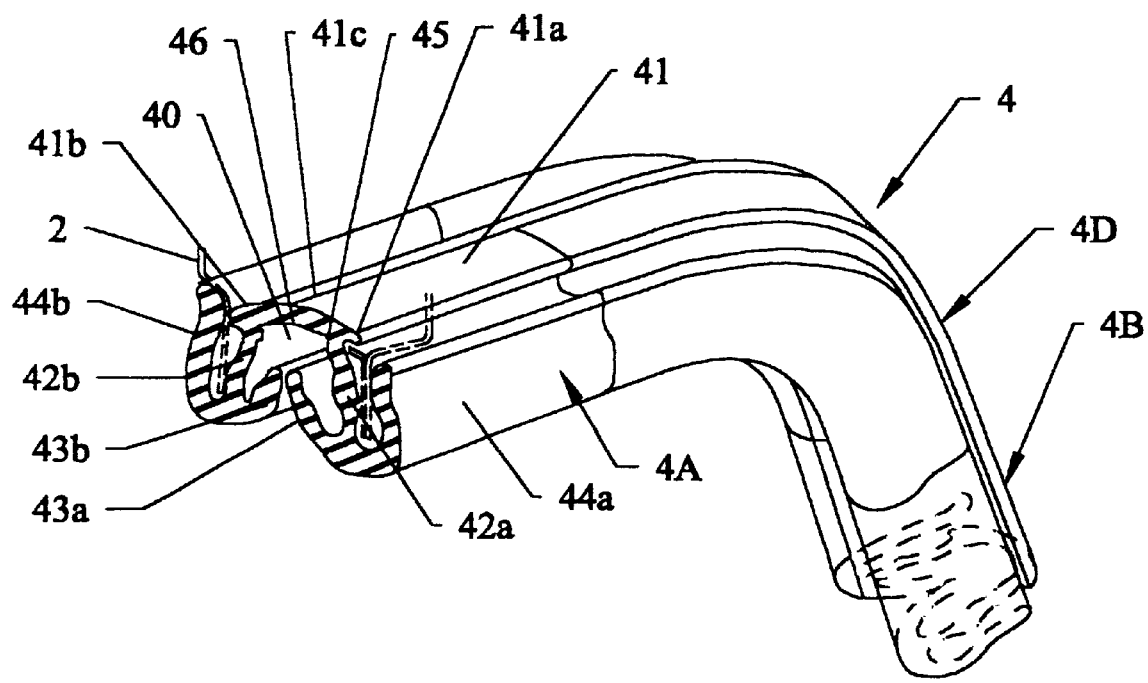
FIG. 6 is a perspective view of a main portion of one embodiment of a glass run in accordance with the present invention, which is attached to the door frame.

As shown in FIGS. 6 to 9, the glass run 4 has an approximately identical cross-section over the entire length thereof. FIG. 6 illustrates the extruded glass runs 4A and 4B and molded corner part 4D which connects them to each other. The glass run 4 includes a main body 40 having a bottom wall 41 and side walls 42a and 42b which extend from widthwise ends of the bottom wall 41 in generally parallel relation to each other. Seal lips 43a and 43b extend from ends of the side walls 42a and 42b in facing directions. Molding lips 44a and 44b extend from the ends of the side walls 42a and 42b outwardly and turn upwardly along the side walls 42a and 42b.

The bottom wall 41 has a gable roof-like cross-section. A peak portion 41c, which is positioned at the widthwise center of the bottom wall 41 bends at an obtuse angle and rises outwardly to define the peak portion 41c as the bending part. Both side faces of the peak portion 41c are substantially flat.

Shallow notches 45 are formed in inner faces of angular parts 41a and 41b between the widthwise ends of the bottom wall 41 and side walls 42a and 42b thereby reducing the thickness of the angular parts 41a and 41b. A notch 46 having a depth greater than that of the shallow notches 45 is formed in an inner face of the peak portion 41c of the bottom wall 41 to make the thickness of the peak portion 41c less than that of the angular parts 41a and 41b.

It is preferable to determine the height of the bottom wall 41 such that, when the glass run 4 is attached, the peak portion 41c abuts a facing bottom wall of the channel 20, and the bottom wall 41 is deformed into a gently curved configuration to expand in the direction of width, and projections 47 provided on both widthwise ends of the bottom wall 41 are engaged with projections 22 of the channel 20 to ensure the attachment of the glass run 4 to the channel 20.

Figure 7:
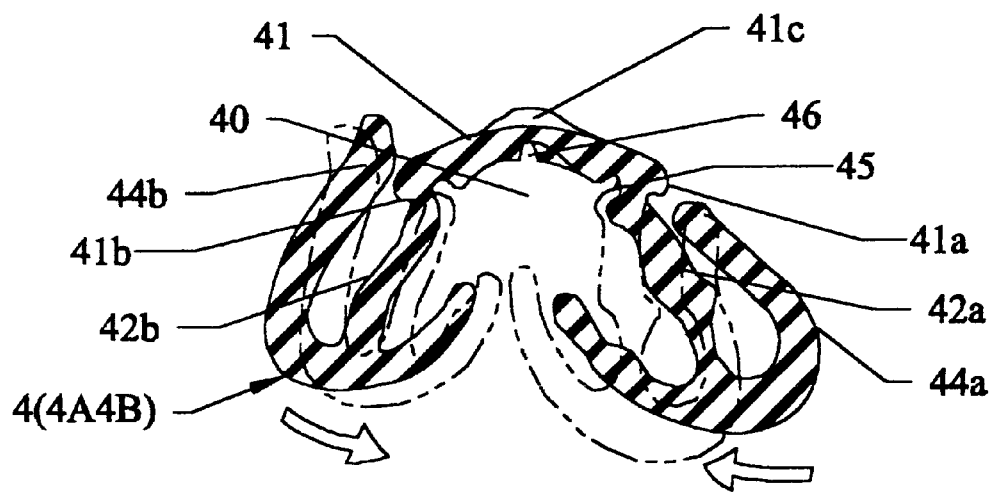
FIG. 7 is a cross-sectional view of the main portion of the glass run of FIG. 6, which is prior to attachment to the door frame.

As shown in FIG. 7, the glass runs 4A and 4B are formed by extrusion so as to have the cross-section wherein the main body 40 gradually spreads apart towards opening ends thereof. The glass runs 4A and 4B thus extruded are connected in a generally right-angled relation to each other by molding via the molded corner part 4D. The molded corner part 4D has a rounded L-like configuration. The molded corner part 4D has a cross-section approximately identical to that of the extruded glass runs 4A and 4B. The extruded glass run 4C is similarly connected to the extruded glass run 4A via the molded corner part 4E which has a gently sloping curve.

Figure 8:
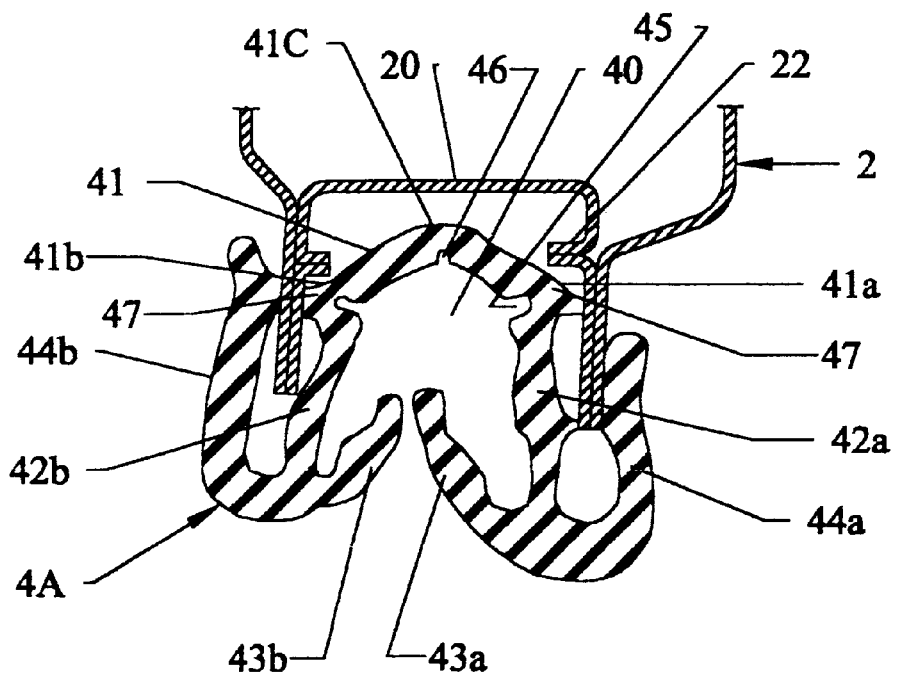
FIG. 8 is a cross-sectional view illustrating the state when the glass run of FIG. 6 is pressed into the door frame for attachment thereto.

When the side walls 42a and 42b of the glass run 4 are pinched and pressed from both sides thereof in the directions shown by the white arrows in FIG. 7 for attachment, as shown by two-dot chain lines therein, the angular parts 41a and 41b of the bottom wall 41 bend slightly in such directions as to decrease the interior angle thereof. The peak portion 41c bends greatly, as compared to the angular parts 41a and 41b, so as to make the width of the bottom wall 41 less than that of the opening of the channel 20. Thus, as shown in FIG. 8, the glass run 4 can be readily inserted into the opening of the channel 20 without tilting the glass run 4 with respect to the channel 20. Consequently, side walls of the channel 20 can be inserted into the respective spaces between ends of the molding lips 44a and 44b and facing side walls 42a and 42b without generating any offset in the inserting position.

Figure 9:
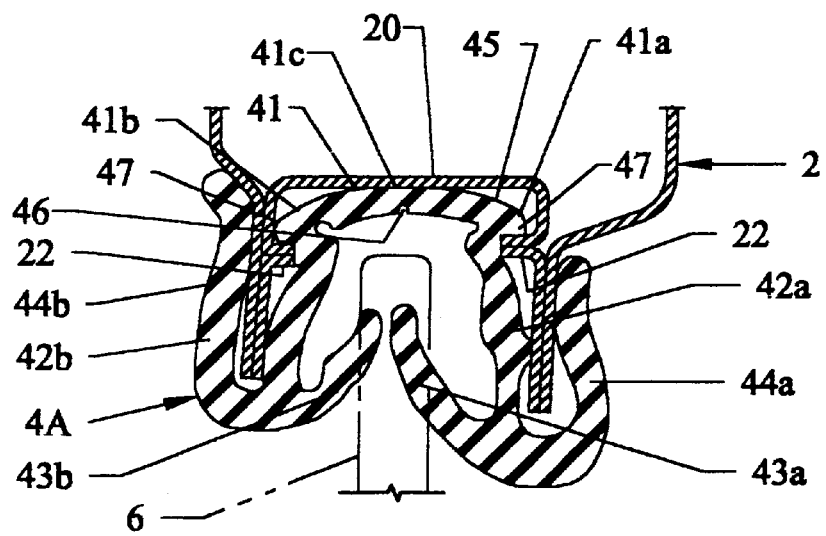
FIG. 9 is a cross-sectional view illustrating the state when the glass run of FIG. 6 is attached to the door frame.

Then, by pressing the glass run 4 which has been inserted into the channel further into the channel 20, the glass run 4 can be fitted to the channel 20 at its proper position, and with its proper posture, as shown in FIG. 9.

When the side walls 42a and 42b of the molded corner part 4D which curves approximately at a right angle are pinched and pressed into a generally parallel relation to fit the molded corner part 4D to the channel 20, the peak portion 41c bends the most, and the angular parts 41a and 41b bend a remarkably small amount, as compared to the conventional glass run having a flat bottom wall. In particular, when the thickness of the peak portion 41c is made less than that of the angular parts 41a and 41b, only the peak portion 41c bends, the angular parts 41a and 41b hardly bend.

This configuration prevents compressive forces from being generated on the radial inside of the molded corner part 4D in the curving direction thereof; thereby preventing the molded corner part 4D from generating any surplus or protrusion on the radial inside thereof.

Thus, the molded corner part 4D can be readily mounted to the channel 20. Furthermore, the attachment of the molded corner part 4D to the channel 20 is facilitated, and the seal against the door glass becomes uniform over the entire length of the molded corner part 4D.

Figure 10:
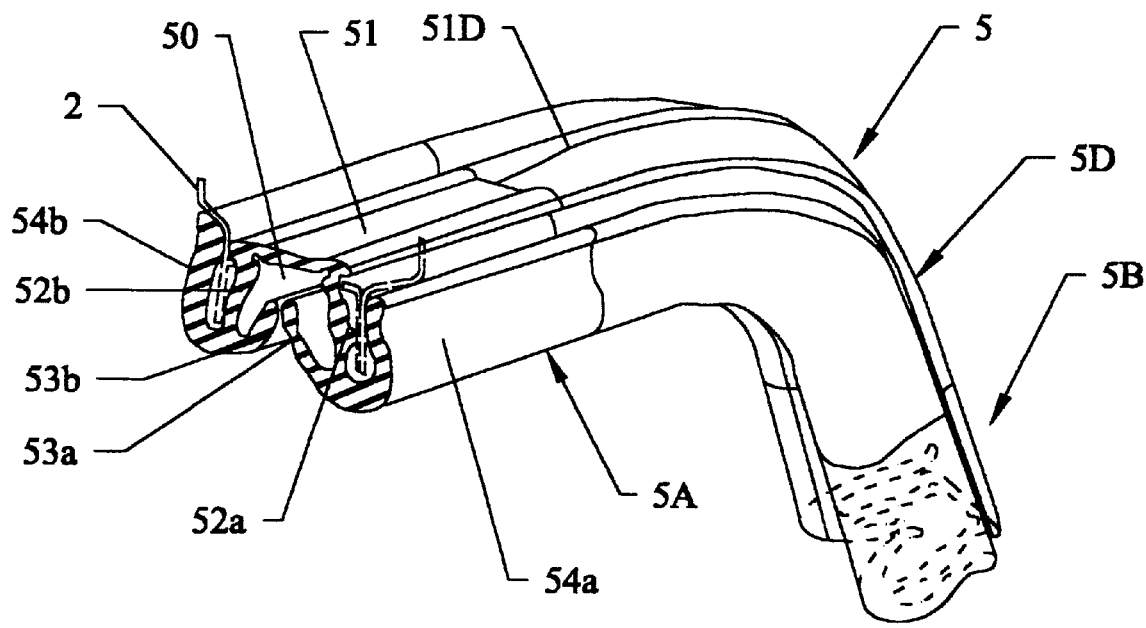
FIG. 10 is a perspective view of a main portion of another embodiment of a glass run in accordance with the present invention, which is attached to the door frame.

FIG. 10 illustrates a main portion of another glass run 5 in accordance with the present invention. As shown, a bottom wall 51 of only a molded corner part 5D of the glass run 5, which curves at an approximate right angle, is formed to have a gable roof-like cross-section while a remaining bottom wall 51 is formed flat.

Extruded glass runs 5A and 5B which are connected via the molded corner part 5D include a main body 50 having a generally U-shaped cross-section. The main body 50 has a flat bottom wall 51 and side walls 52a and 52b which extend from widthwise ends of the flat bottom wall 51 so as to face each other. Reference numerals 53a and 53b denote seal lips and reference numerals 54a and 54b denote molding lips.

Longitudinal ends of the molded corner part 5D, which are connected to the extruded glass runs 5A and 5B, respectively, have a cross-section approximately identical to that of the extruded glass runs 5A and 5B. The bottom wall 51 of the molded corner part 5D is formed into a gable roof-like cross-section such that the height of a peak portion which is positioned at the widthwise center of the bottom wall 51 increases gradually toward the corner center of the molded corner part 5D, which has a cross-section substantially identical to that of the preceding embodiment (FIGS. 6 to 8).

With this arrangement, a surplus or protrusion is not generated on the radial inside of the molded corner part 5D, similar to the preceding embodiment. Thus, the molded corner part SD can be readily mounted to the channel 20. Additionally, the seal against the door glass becomes uniform over the entire length of the molded corner part 5D.

The molded corner part 4E (FIG. 1) has a large radius of curvature in comparison to that of the molded corner part 4D. So, when the side walls 42a and 42b of the molded corner part 4E are pressed and deformed into a generally parallel relation for attachment to the door frame 2, the molded corner part 4E does not generate any significant surplus, as compared to the case of the molded corner part 4D. Therefore, it is not necessary that the bottom wall 41 of the molded corner part 4E have a gable roof-like cross-section. However, by forming the bottom wall 41 into a gable roof-like cross-section, the attaching operation of the molded corner part 4E to the door frame 2 becomes easier.

The glass run in accordance with the present invention, of which a bottom wall has a gable roof-like cross-section over the entire length thereof, can be easily attached to the door frame without being tilted.

Additionally, the glass run in accordance with the present invention, of which a bottom wall has a gable roof-like cross-section in a molded corner part thereof which curves approximately at a right angle, can be readily attached to the door frame with an improved external appearance, and without generating any surplus or protrusion in the molded corner part.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A door glass run provided along an inner periphery of a motor vehicle door frame for attachment to a channel having a generally U-shaped cross-section and for effecting a seal between the door frame and window glass therein when elevated to its fully closed position, comprising:

a main body having a bottom wall and side walls extending from each of opposing widthwise ends thereof so as to face each other; and a seal lip which extends from an end of each of the side walls in facing directions for engaging the window glass;

said bottom wall having a triangular shaped cross-section, a peak portion of which bends and rises outwardly, said peak portion having a notch in an inner face thereof to make the thickness of said peak portion less than that of annular parts which connect said widthwise ends of said bottom wall to said side walls, such that when the door glass run is inserted into the channel, said peak portion further bends and rises outwardly along said notch in a direction toward the channel to reduce the width of said bottom wall.

2. A door glass run as claimed in claim 1, wherein said door glass run includes a plurality of extruded glass runs and a plurality of molded glass runs, each of said plurality of molded glass runs having a corner shaped configuration and connecting said plurality of extruded glass runs to each other.

3. A door glass run as claimed in claim 2, wherein at least one of said plurality of molded glass runs curves approximately at a right angle, and includes the bottom wall having said triangular-shaped cross-section.

4. A door glass run as claimed in claim 2, wherein said plurality of extruded glass runs and said plurality of molded glass runs continuously include the bottom wall having said triangular-shaped cross-section.

5. A door glass run as claimed in claim 1, further comprising:

molding lips which extend outwardly from ends of the side walls and further extend along the side walls, the molding lips engaging walls of the channel with the side walls.

6. A door glass run according to claim 1, wherein the peak portion contacts a central portion of the channel during installation and remains in contact therewith following installation.

7. A door glass run provided along an inner periphery of a motor vehicle door frame for attachment to a channel having a generally U-shaped cross-section and for effecting a seal between the door frame and a window glass therein elevated to its fully closed position, comprising:

a main body having a bottom wall and a side wall extending from each of opposing widthwise ends thereof so as to face each other; and a seal lip which extends from an end of each of the side walls in facing directions for holding a periphery of the window glass;

wherein the bottom wall has a triangular shaped cross-section forming a peak portion that bends and rises outwardly of said main body; and said peak portion including a notch formed in an inner face thereof and positioned at a central position of said bottom wall such that when the door glass run is inserted into the channel, said peak portion further bends and rises along said notch in a direction toward the channel to reduce the width of said bottom wall.

8. A door glass run according to claim 7, further including an outwardly extending projection positioned at each of the opposing widthwise ends.

9. A door glass run according to claim 8, wherein portions of said bottom wall adjacent each side of said notch define an obtuse angle therebetween before said door glass run is inserted into the channel, and after inserted into the channel, said outwardly extending projection is engaged with said channel, thereby ensuring the attachment of said door glass run to the channel.

* * * * *